United States Patent [19]
McDonald William C.

[11] 3,748,554
[45] July 24, 1973

[54] STEPPING MOTOR DRIVE CIRCUIT PROVIDING COLLAPSING FIELD ENERGY STORAGE

[75] Inventor: McDonald William C., Belmont, Mass.

[73] Assignee: Cambridge Thermionic Corporation, Cambridge, Mass.

[22] Filed: May 3, 1971

[21] Appl. No.: 139,722

[52] U.S. Cl.............. 318/138, 318/696, 318/439, 321/45 ER
[51] Int. Cl. ............................................ H02p 9/04
[58] Field of Search................ 318/696, 685, 135, 318/437, 341; 321/45 ER

[56] References Cited
UNITED STATES PATENTS

| | | | |
|---|---|---|---|
| 3,560,821 | 2/1971 | Beling............................ | 321/45 ER |
| 3,560,817 | 2/1971 | Amato............................. | 318/138 |
| 3,525,100 | 8/1970 | Duff................................ | 321/45 X |
| 3,530,347 | 9/1970 | Newell............................ | 318/696 |
| 3,444,447 | 5/1969 | Newell............................ | 318/696 |
| 3,486,096 | 12/1969 | Van Cleave..................... | 318/696 |
| 3,560,818 | 2/1971 | Amato............................ | 318/45 |
| 3,609,511 | 9/1971 | Risberg.......................... | 321/45 ER |
| 3,500,170 | 3/1970 | Charrin et al................... | 321/45 |
| 3,569,819 | 3/1971 | Martzloff........................ | 321/45 |

Primary Examiner—G. R. Simmons
Attorney—Sewall P. Bronstein, John D. Woodberry, Robert T. Gammons, Donald Brown, Robert L. Goldberg and Robert F. O'Connell

[57] ABSTRACT

A drive circuit for supplying current to individual coils of a stepping motor for the duration of a signal pulse, the drive circuit being characterized by a high rate of current decrease in the coil at the end of the signal pulse and efficient use of power sources. The drive circuit has a bridge configuration with the stepping motor coil connected across one bridge diagonal. Connected across the other bridge diagonal is an energizing potential such as a DC power source. Two opposite sides of the bridge have diodes connected therein, the diodes being oriented so as to be back biased by the energizing potential. The remaining two opposite sides of the bridge contain switching transistors, oriented so as to be forward biased by the energizing potential. Switch control means, responsive to the signal pulses, are provided to turn on the switching transistors at the beginning of a signal pulse to energize the coil, and to turn off the transistors at the end of a signal pulse so that the coil will discharge through the diodes back into the energizing potential for storage of the energy of discharge from the coil.

4 Claims, 4 Drawing Figures

STEPPING MOTOR DRIVE CIRCUIT PROVIDING COLLAPSING FIELD ENERGY STORAGE

BACKGROUND OF THE INVENTION

The field of the present invention relates to circuits used to energize stepping motor coils in response to instructions in the form of signal pulses.

Stepping motors, as exemplified by the stepping motor disclosed in the co-pending application of Frank N. Lyman, Jr., Ser. No. 144,494, filed May 18, 1971 have a number of phases, each comprising a set of rotor poles, a set of stator poles alignable with the rotor poles, and a coil energizable to bring the rotor and stator poles into alignment through magnetic interaction. The phases have their rotor or stator poles successively offset by an angle equal to 360/NM where N equals the number of phases and M equals the number of rotor or stator poles in each phase. The phases are energized sequentially with a phase lag equal to their angular offset, thereby bringing successive sets of poles into alignment and causing rotation of the shaft to which the rotors are affixed.

As one of the advantages of stepping motors is their ability to provide precise angular control, useful for numerical or pulse programmed control of machinery, for example, it is important that the energization of the stepping motor coils take place within precise time limits as determined by a signal pulse. In the allotted period, current must be supplied to the coil and then terminated. To obtain high torque and high speeds, it is advantageous to provide a high rate of increase of coil current at the beginning of a signal pulse without causing unnecessary energy dissipation during the remainder of the pulse, as is more fully set forth in my co-pending application Ser. No. 139,721, filed May 3, 1971, under the title Stepping Motor Drive Circuit with Switch Controlled Coil Energization.

A related problem of coil energization occurs at the end of the energization period when coil current is to be rapidly reduced to zero so that there will be no attraction of rotor and stator poles in a direction opposite to that intended. To reduce current to zero quickly, the energy of the collapsing field in the coil must be rapidly removed. Heretofore, this has been accomplished by transferring the stored coil energy to an energy dissipative device such as a resistor or Zener diode where it does no productive work and sometimes creates a cooling problem.

SUMMARY OF THE INVENTION

Objects of the present invention are to provide a stepping motor drive circuit acting in response to a signal pulse to energize a stepping motor coil, which is capable of channeling collapsing field energy in a way enabling it to be reused, which is simple and economical to construct and reliable in use, and which is compatible with a variety of coil energizing methods.

The stepping motor drive circuit according to the invention supplies current to a stepping motor coil in response to a signal pulse and comprises, in bridge configuration, a source of energizing potential, such as a rectified DC voltage source using a filter capacitor as storage element, connected across one bridge diagonal. Connected across the other bridge diagonal is the stepping motor coil. In two opposite sides of the bridge, diode means are provided, oriented so as to be back biased by the source of energizing potential. In the remaining two opposite bridge sides, switch means are connected, the switch means preferably comprising transistors oriented to be forward biased by the source of energizing potential. Responsive to the signal pulses, and connected to the transistor switch means, are switch control means causing the transistor switch means to conduct at the beginning of a signal pulse, thereby to energize the coil, and causing the transistor switch means to become non-conductive at the end of a signal pulse, whereby the collapsing field of the coil will direct current through the diode means back into the source of energizing potential where it can be stored, as in a filter capacitor, and made available for subsequent use.

These and other objects and novel aspects of the invention will be apparent from the following description of preferred embodiments thereof.

DESCRIPTION OF THE PREFERRED EMBODIMENTS

Figure 1:
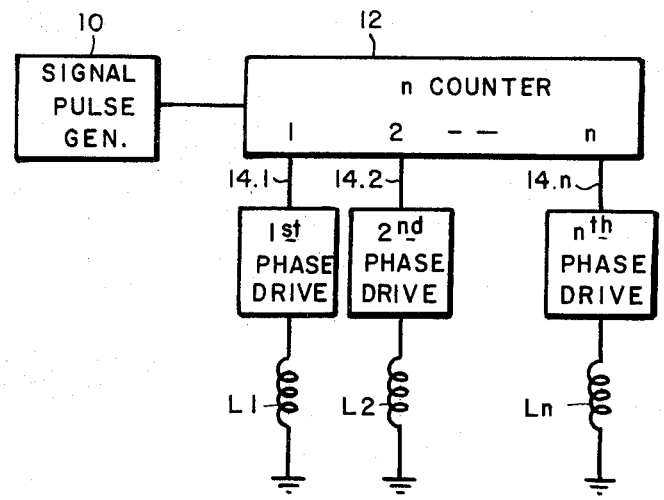
FIG. 1 is a diagram of a typical stepping motor control arrangement.

FIG. 1 illustrates a simple control arrangement for a stepping motor having n phases and therefore $n$ coils denoted L1, L2, ... L$n$. Other more complicated control arrangements, particularly the so-called 3-2 phase driving sequence, are commonly resorted to for stepping motor control, and the phase drivers of the present invention work equally well under their control. However, for simplicity of description, the control of FIG. 1 is selected to illustrate a typical application of use. Instructions for energization of the coils are provided by a signal pulse generator 10, which may be a computer, or other source of programmed pulses, or simply a steady pulse generator if the stepping motor is not to have programmed control. Signal pulse generator 10 drives a counter 12 of capacity $n$. The counter 12 has $n$ different outputs 14.1, 14.2, ... 14$n$ connected respectively to drive circuits 16.1, 16.2, ... 16$n$ which supply current to the coils L1 through L$n$. The counter 12 supplies output 14.1 with the first input pulse and every nth input pulse thereafter, i.e., 1, $n$ + 1, 2$n$ + 1, etc. Similarly, output 14.2 receives pulse 2, $n$ +2, 2$n$ + 2, etc. Thus counter 12 acts both as a frequency divider and as a phase distributor in allocating signal pulses to the coils L1 through L$n$. As far as the individual drive circuit 16.1 through 16.$n$ are concerned, they are to respond only to the individual signal pulses which they receive, and their action is thus independent of the action of the other drive circuits, although they may have common parts such as a common power supply. In the following description, only one drive circuit and associated coil will be described even though a plurality of them will typically be used in a normal multiphase stepping motor.

Figure 2:
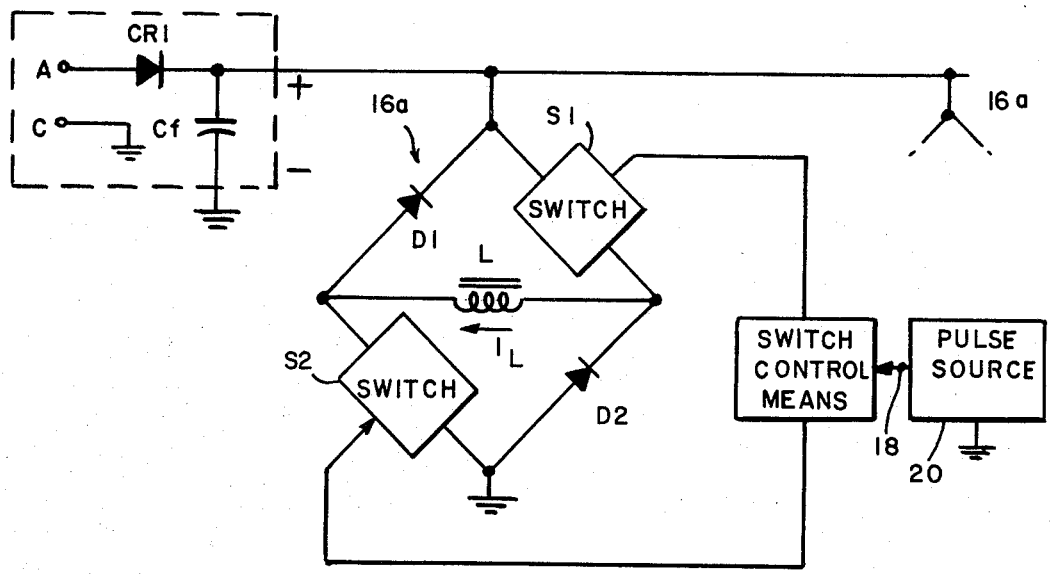
FIG. 2 is a schematic of a drive circuit according to the invention.

FIG. 2 illustrates the structure of a generalized drive circuit 16a adapted to supply current IL through a stepping motor coil L for the duration of a signal pulse applied to input terminal 18 from a source 20 (which can include a generator 10 and counter 12 as in FIG. 1). In accordance with the principles of the invention, drive circuit 16a has a source of energizing potential p in the form of a conventional DC power supply with alternating current at terminals A,C being rectified by rectifier CR1 and having its energy stored in filter capacitor CF at the peak AC voltage. Drive circuit 16a has a bridge configuration, and energizing source p forms one diagonal of the bridge (as FIG. 2 shows, energizing source p can serve other drive circuits for other coils too). The coil L is connected as the other diagonal of the bridge. Diodes D1 and D2 are connected to form two opposite sides of the bridge, and are oriented so that they are back biased by energizing source p. The remaining two sides of the bridge have switch means S1 and S2 connected therein, and a switch control means 22, responsive to signal pulses at terminal 18, causes switch means S1 and S2 to change between conductive and non-conductive states.

During a cycle of operation, switch control means 22 simultaneously turns on switch means S1 and S2 and makes them conductive at the beginning of a signal pulse appearing at input 18. With diodes D1 and D2 back biased, the only available path for current to take from source p is through a current path which includes switch S1, coil L and switch S2. As the coil L is energized, its current IL will flow in the direction shown. When the signal pulse at input 18 terminates, switch control means 22 turns off switch means S1 and S2 and renders them non-conductive. The stored energy in coil L must discharge with coil current continuing in its original direction. The voltage across coil L therefore rises sufficiently to counteract the voltage of source p and forward biases diodes D1 and D2, so that current will flow through a path including diodes D1 and D2 and coil L back into energizing source p where it is stored in filter capacitor CF for reuse. When the stored energy in coil L has been transferred into energizing source p, the coil voltage drops and diodes D1 and D2 are again back biased and circuit 16a is ready to begin a new coil energizing cycle.

From the foregoing description of the functional operation of diodes D1 and D2, it is apparent that they could be replaced by other devices which duplicate their switching function. For example, diodes D1 and D2 could be replaced by controlled switches similar to S1 and S2, with means similar to switch control means 22 to cause them to change from conductive to non-conductive states with the timing previously described for diodes D1 and D2. Other devices could similarly be arranged to perform the diode function of diodes D1 and D2 in the manner described, in the circuits of FIGS. 3 and 4 described below as well as in the circuit of FIG. 2, and the description of the diode function therein is meant to include other devices operating in a similar fashion.

Drive circuit 16a is illustrated with a general switch control means 22 which controls switches S1 and S2 to cause them to both be conductive while coil L is being energized, and to cause them both to be non-conductive while coil L is being de-energized. In one conventional form of stepping motor coil energization, switch control means 22 simultaneously actuates switches S1 and S2 to cause them to become conductive at the beginning of a signal pulse at terminal 18, maintains switches S1 and S2 conductive to apply the direct voltage of source p for the duration of the signal pulse, and then simultaneously renders them non-conductive at the end of the signal pulse. In this conventional form of stepping motor coil energization, the coil current IL rises exponentially with a time constant determined by the resistive and inductive parameters of the circuit through the coil L. As explained more fully in my co-pending application Ser. No. 139,721, filed May 3, 1971, this conventional form of stepping motor energization can be improved upon by energizing the coil with controlled switching of a higher voltage source, thereby achieving more rapid current rise with efficient use of power sources. One advantageous feature of the present invention is that it is compatible with many coil energization techniques, including the energization techniques of the above-mentioned patent application, illustrated in connection with FIGS. 3 and 4.

Figure 3:
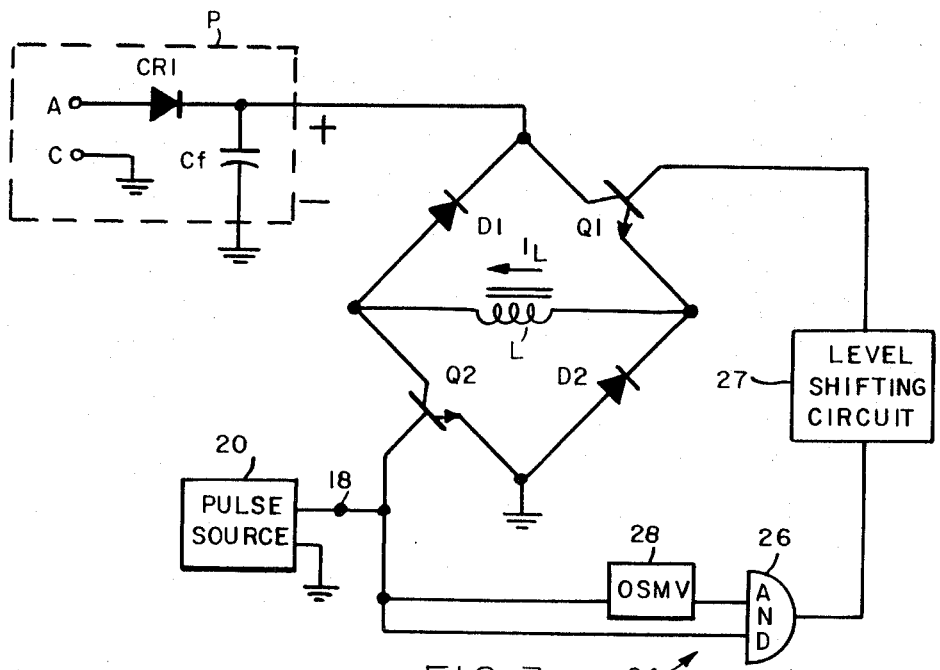
FIG. 3 is a second drive circuit according to the invention.

FIG. 3 illustrates a stepping motor drive circuit 16b having a bridge configuration with coil L connected across one bridge diagonal. Connected across the other bridge diagonal is an energizing power source p of electrical potential high enough to be capable of causing the desired rapid current increase in coil L. Diodes D1 and D2 are connected to form two opposite sides of the bridge, and are oriented so as to be back biased by power source p. The remaining two opposite sides of the bridge contain switching transistors Q1 and Q2, oriented so as to be forward biased by power source p. Switch control means 24, similar to switch control means 22 in FIG. 2, accepts signal pulses at input terminal 18 from a source 20 and controls the conductivity of transistors Q1 and Q2, with AND gate 26 and monostable multivibrator 28 being provided to turn on transistor Q1 only for a selected interval time D sufficient to bring coil current IL to a predetermined peak level Ip. Since the base of transistor Q1 may be substantially elevated above the output of AND gate 26, a level shifting circuit 27 of conventional construction is commonly provided to permit the AND gate 26 output to switch transistor Q1. The operation of the circuit of FIG. 3 is as follows: When a signal pulse appears at input 18, transistor Q2 is turned on directly, and transistor Q1 is turned on through AND gate 26 and multivibrator 28, with the result that power source p is connected in series with coil L through transistors Q1 and Q2 for the length of interval D and coil current IL rises to the predetermined level Ip. At the end of interval D, multivibrator 28 turns off and disable AND gate 26 to turn transistor Q1 off, thus disconnecting power source p from coil L. Coil current IL continues to flow through transistor Q2, which is still on, and diode D2, now forward biased by the voltage across coil L. Coil current IL will decay according to the resistance characteristics of the circuit through transistor Q2, diode D2, and coil L. Particularly at high frequencies, when the duration of a signal pulse at input 18 is short, current IL does not decay significantly during an energizing pulse. When the signal pulse at terminal 18 ends, both transistors Q1 and Q2 will be turned off. The only available path for current in coil L to take is through diodes D1 and D2, back into power source p where the energy so carried from the coil L can be stored for reuse in filter capacitor CF. The voltage developed across coil L in order to discharge through diodes D1 and D2 need only to rise to the level at which the diodes become conductive, which is approximately the voltage of the power source p. Each of transistors Q1 or Q2 thus has only this voltage impressed across it during the inductive discharge, which is a lower voltage than that developed in previous devices discharging through a Zener diode.

Figure 4:
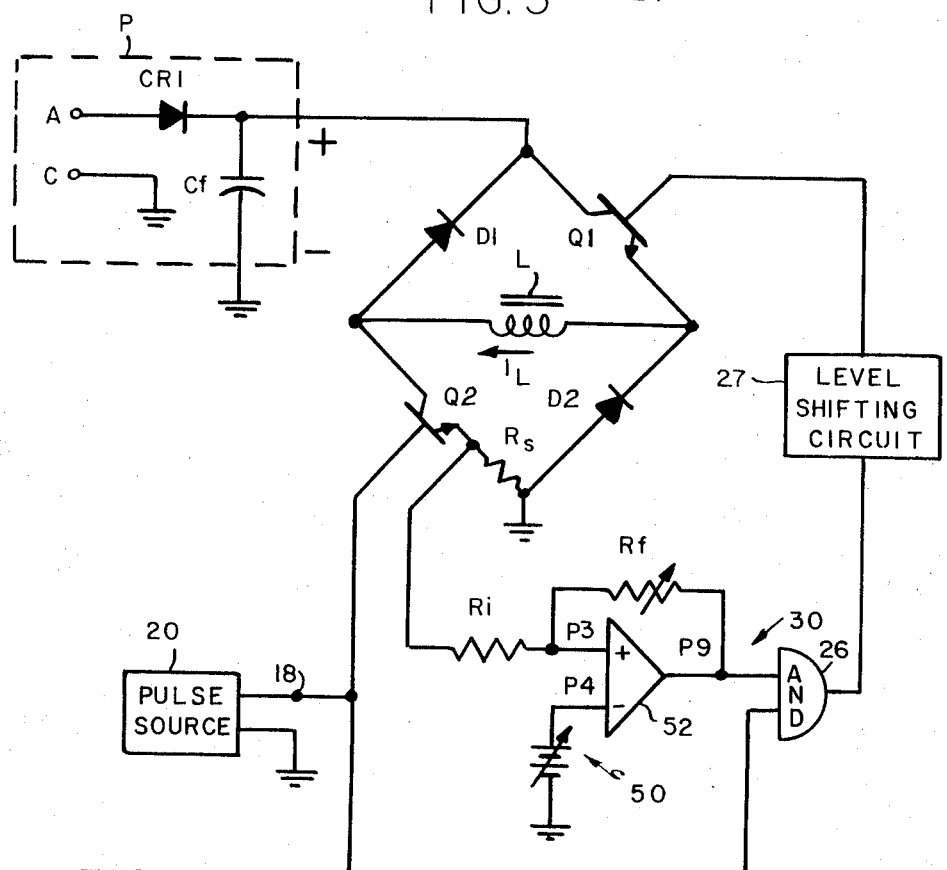
FIG. 4 is a third drive circuit according to the invention.

FIG. 4 illustrates another drive circuit 16c employing a bridge configuration, but with a switch control means 30 using a current level detecting means 50 to control the connection of the power source p to the coil L. The bridge configuration of drive circuit 16c connects coil L as one bridge diagonal and the power source p as the other bridge diagonal. Diodes D1 and D2 are connected in two opposite bridge sides and are oriented so as to be back biased by power source p. In the two remaining bridge sides, switching transistors Q1 and Q2 are connected, oriented to be forward biased by power source p.

Switch control means 30 has input terminal 18 receiving signal pulses from a source 20 to directly control transistor Q2 and to enable an AND gate 26 controlling transistor Q1 through level shifting circuit 27. The second input to AND gate 26 is from current level detecting means 50 arranged to detect the rise of coil current IL to a predetermined peak level Ip. Level detecting means 50 has sensing resistor Rs connected between ground and the emitter of transistor Q2 where it receives a current comprised of coil current IL and the steady base current of conducting transistor Q2. A sensing amplifier 52, connected to operate as a triggered switch with input resistor Ri and feedback resistor Rf, has its trigger level established by a biasing battery B3 to correspond to passage through resistor Rs of predetermined current level Ip plus the base current of transistor Q2. A suitable example for sensing amplifier 52 is Fairchild Model 710 dual in line I.C., with connections made to pin terminals identified in FIG. 4 as f.g. "P3) for pin number three. Level detecting means 50 has an output to AND gate 26 which enables AND gate 26 and turns on transistor Q1 at the beginning of a signal pulse at input 18 (when no current yet flows through resistor Rs), and disables AND gate 26 and turns off transistor Q1 when current rises to predetermined level Ip. In addition, level detecting means 50 is arranged to again enable AND gate 26 and turn on transistor Q1 if coil current falls from predetermined level Ip to a lower switching level Is as set by feedback resistor Rf of amplifier 52. Coil current IL can thus be carefully controlled to remain within the range Ip to Is without using a secondary potential source to maintain current and without relying on slow decay characteristics or high frequencies to prevent coil current from falling significantly.

Operation of drive circuit 16c is as follows:

Upon arrival of a signal pulse at input terminal 18, transistor Q2 is turned on directly and transistor Q1 is turned on through AND gate 26, both inputs of which are then present. Power source p energizes coil L through a circuit path including transistors Q1 and Q2 and resistor Rs. When coil current IL rises to predetermined level Ip, as sensed by resistor Rs, level detecting means 50 disables AND gate 26 and transistor Q1 is turned off. Coil current IL continues to flow, through a second circuit path including transistor Q2, resistor Rs, and diode D2, until it falls to switching level Is as sensed by resistor Rs. Level detecting means 50 thereupon enables AND gate 26, reconnecting power source p through coil L to raise current again to level Ip. Coil current IL continues to oscillate between the level Ip and Is for as long as a signal pulse appears at input 18.

When the signal pulse ends, transistors Q1 and Q2 are turned off and the collapsing field in coil L sends current through a third circuit path which includes diodes D1 and D2 back into capacitor CF of power source p for storage. As in the case of drive circuit 16b, the maximum voltage impressed across either transistor Q1 or Q2 is limited to the voltage across capacitor CF.

The general drive circuit 16a illustrated in FIG. 2 can be modified in other ways for compatibility with other coil energization techniques as will now be apparent. For example, instead of using rectified DC power source p to energize coil L, a storage battery could be used instead, or a different power source whose potential was varied with time for particular purposes could be employed. With any such modification, the drive circuit according to the invention still provides a discharging current path back into the power source to permit the coil energy to be rapidly transferred from the coil in a way enabling it to be stored for subsequent reuse.

It should be understood that the present disclosure is for the purpose of illustration and that the invention includes all modifications and equivalents falling within the scope of the appended claims.

I claim:

1. A stepping motor drive circuit for supplying current to a coil for the duration of a signal pulse comprising, in bridge configuration:

a source of energizing power connected as one bridge diagonal;

the coil being connected as the other bridge diagonal;

diode means connected in each of two opposite bridge sides and being back biased by said energizing power source;

controllable switch means in each of the remaining two opposite bridge sides; and control means for said switch means, responsive to a signal pulse, for turning on said switch means simultaneously to provide a first current path through said switch means for energizing of the coil, for turning off one of said switch means after a preselected time interval, said coil remaining energized after said time interval, and for turning off the other of said switch means at the end of said signal pulse to provide a second current path through said diode means for discharge of stored coil energy back into the energizing power source.

2. A stepping motor drive circuit according to claim 1 wherein said switch means comprise transistors forward biased by said energizing power source; and said control means includes a monostable multivibrator operative for said preselected time interval.

3. A stepping motor drive circuit according to claim 1 wherein said energizing power source includes a capacitive storage element and wherein energy is transferred from said coil to said element through said diode means.

4. A stepping motor drive circuit for supplying current to a coil for the duration of a signal pulse, comprising:

an energizing power source;

first circuit means providing a first current path through said power source and coil thereby to cause current to flow in said coil;

second circuit means providing a second current path through said coil after a preselected time interval such that current is maintained in said coil after said time interval;

third circuit means providing a third current path through said power source and coil such that current induced in the coil through the first and second circuit paths is directed in the third path back into the energizing power source; and control means for connecting the energizing power source and coil through the first circuit path at the beginning of a signal pulse, thereby to energize the coil, for connecting the coil through the second circuit path after said preselected time interval, thereby to maintain the coil energized, and for connecting the energizing power source and coil through the third circuit path at the end of said signal pulse, thereby to discharge the coil energy back into the power source.

* * * * *